Oct. 29, 1968 M. P. BREEDVELD ETAL 3,408,583

MAGNETIC AMPLIFIER

Filed Feb. 3, 1964 3 Sheets-Sheet 1

INVENTORS
MARINUS P. BREEDVELD
CORNELIS J.M. HUIJBEN
BY
Frank R. Trifari
AGENT

INVENTORS
MARINUS P. BREEDVELD
CORNELIS J.M. HUIJBEN
BY
Frank R. Jifari
AGENT

Oct. 29, 1968 M. P. BREEDVELD ETAL 3,408,583

MAGNETIC AMPLIFIER

Filed Feb. 3, 1964

3 Sheets-Sheet 3

INVENTORS
MARINUS P. BREEDVELD
CORNELIS J.M. HUIJBEN
BY
Frank R. Trifari
AGENT 3,408,583

MAGNETIC AMPLIFIER

Marinus Pieter Breedveld, The Hague, and Cornelis Josephus Maria Huyben, Emmasingel, Eindhoven, Netherlands, assignors to North American Philips Company, Inc., New York, N.Y., a corporation of Delaware Filed Feb. 3, 1964, Ser. No. 342,206

Claims priority, application Netherlands, Feb. 8, 1963, 288,713

18 Claims. (Cl. 330—8)

ABSTRACT OF THE DISCLOSURE

A magnetic amplifier includes a winding wound on a saturable magnetic core. A first rectifier is connected in series with the winding, a source of A.C. voltage and a load. A capacitor is coupled to the winding to form a resonant circuit therewith tuned approximately to the frequency of the A.C. voltage. A control circuit is coupled to the winding and comprises an adjustable damping element in series with a second rectifier poled so as to pass a current to the winding which magnetizes the core in the same direction as the load current passed by the first rectifier.

Figures 1, 2, 3A, 3B, 3C, 4, 5, 6, 7, 8:
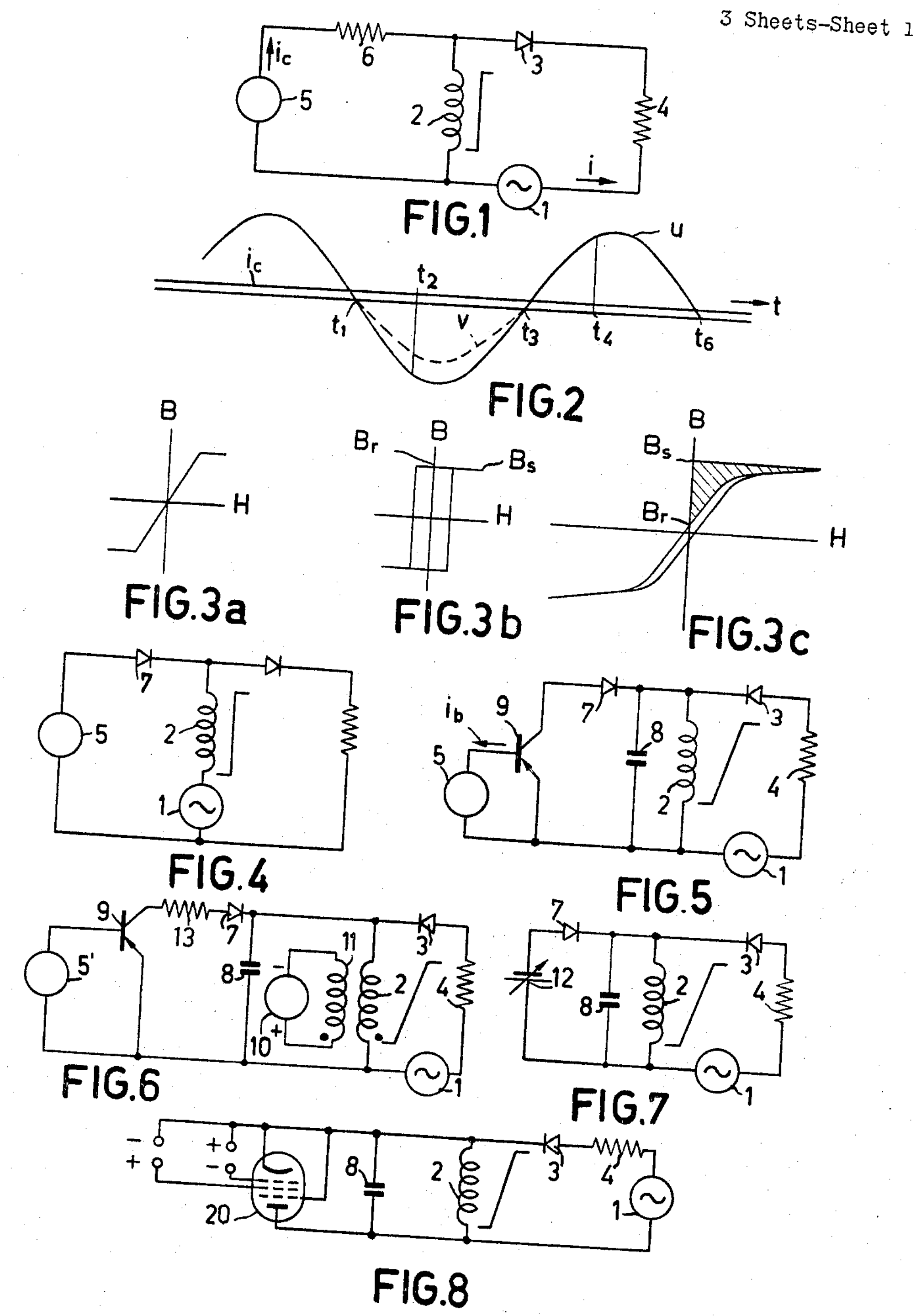

This invention relates to magnetic amplifiers—sometimes referred to as a "magnetic modulator." More particularly, the invention relates to novel circuits for a magnetic amplifier which may be used in single form for certain purposes, but is also applicable in multiplex form in bilateral, two-phase, three-phase and in general multiphase push-pull and compensating circuits, and the output of which may be designed for providing direct-current power, alternating-current power or a combination thereof.

An important part of a magnetic amplifier is the transductor: a core of ferromagnetic material, which carries one or more windings conveying currents the combined influence of which may set the core to a state of magnetic saturation. This state being reached, the winding which is included in the load circuit has substantially zero impedance and the current flowing through it is then determined by the instantaneous value of the alternating voltage of the supply source and the impedance of the load.

The current originating from a signal source, which is also determinative of the moment at which the state of saturation sets in, is referred to as a "control current" and is supplied in most, but not necessarily all, cases, to a separate winding on the core. In prior forms of magnetic amplifiers the number of ampere turns of this control current is of the order of magnitude of the number of ampere turns of the load current. In modern magnetic amplifiers the control current is reduced to the order of magnitude of the magnetization current for the given core, related to the control winding. This result is obtained by adding a rectifier element in series with the winding through which the load current must flow. The combination transductor-rectifier (self-saturating reactor) may bring about a voltage drop in two ways, namely on the winding when the core is not saturated, and on the rectifier when it is cut off relative to the polarity of the voltage applied.

The value of the addition of the rectifier resides in the fact that the transductor need not or substantially not effect a voltage drop during the portion of the cycle of the alternating supply voltage in the load circuit in which the rectifier is cut off, and also in the fact that no voltage is introduced into the control circuit. Such voltage would have an interfering effect in obtaining the control action the object of which is to adjust the magnetization of the core so that during the succeeding half cycle, in which a load current could flow indeed, the voltage during a portion of this half cycle is first absorbed by the transductor and this up to the moment when the core becomes saturated. This moment is thus determined by and hence controllable by the control circuit as a function of the adjustment of the magnetization (reset).

Logan utilized this possibility for the first time in 1931 in the circuit called after him (FIGURE 1) in which the load winding and the control winding may either coincide or be constituted by two parallel windings, where necessary with different numbers of turns.

FIGURE 2 shows the variation in currents and voltages in the simplified case where the material of the core exhibits an idealized hysteresis curve B–H as shown in FIGURE 3*a*.

The supply current from a source 1 then flows through a transductor 2, a rectifier 3 and a load 4. The magnetization of the transductor 2 is controlled by a control circuit including a source having an internal resistance 6 (which resistance may be increased, if desired, by an external resistance).

Current flows from the supply source 1 through the transductor 2, the diode 3 and the load 4 during the half cycle $t_3$–$t_6$ of the alternating supply current $i$ in which the diode 3 is conducting. As long as the transductor 2 is not saturated, the supply voltage $u$ of the source 1 will substantially appear across the transductor 2, but as soon as the transductor 2 is saturated, substantially the full supply voltage will be set up across the load 4.

During the time $t_2$–$t_3$ in which the diode 3 is cut off, the control current $i_c$ determines the state of magnetization of the material of the core and hence the initial flux at the instant $t_3$ of the succeeding half cycle. The time required to set the material of the core from this initial flux to saturation again is thus determined by the control current $i_c$. Assuming that saturation is reached at the instant $t_4$, then in accordance with the foregoing the supply voltage $u$ will be substantially absorbed by the load 4 only during the time interval $t_4$–$t_6$. This time interval, and hence the energy dissipated in the load 4, is thus controllable by means of the control current $i_c$.

Although in this circuit the reaction of the load circuit on the control circuit is partly eliminated by the rectifier 3, the reaction still occurs during the time interval $t_3$–$t_4$ in which the transductor absorbs the supply voltage. Said voltage is then completely active in the control circuit. To minimize the current resulting from this voltage, the resistor 6 would need a high value, but this increases again the supplied control power despite the small control current required. If an inductance was substituted for the resistor 6 and connected in series with the control source 5, the time of response of the device would thus become considerable. The term "time of response" means the time which elapses between the moment when the control voltage from the source 5 is caused abruptly to vary and the moment when the resulting variation of current in the load 4 has reached a value $(1-1/e)$ of the total current variation, where $e$ is the base number of the natural logarithms.

Ramey realized that the control circuit need not be connected at all to the transductor between the instants $t_3$ and $t_4$ or even between the instants $t_3$ and $t_6$. In the circuit named after him, as shown in simplified form in FIGURE 4, (see, for example, U.S. Patent No. 2,719,885), the periodic release of the control circuit during said period is obtained by including a rectifier 7 in the control circuit and including the source 1 of alternating supply voltage in the load circuit as well as in the control circuit. The control voltage source 5, which may be constituted by a transistor, if desired, is thus connected to the transductor 2 only during a portion of a cycle.

The shape of the magnetization curve is very important in the said two forms of a magnetic amplifier. Closer consideration shows that magnetic material having a sharp transition from the unsaturated state to the saturated state and exhibiting as steep a variation as possible in the unsaturated branches, which must furthermore lie as close together as possible, yields optimum results as regards amplification of power. However, as mentioned above, the Logan amplifier permits a high amplification of power only at the expense of a long time of response. On the contrary, in the Ramey amplifier a high amplification of power as well as a short time of response may be obtained, provided that the magnetic material of the transductor also exhibits a ratio of the remanence $B_r$ to the saturation inductance $B_s$ which closely approaches unity (FIGURE 3*b*). Such a material having a so-called "rectangular hysteresis loop," e.g., the material known as "Deltamax," is very expensive, however, and must be treated carefully so that its use for high powers is in practice excluded.

An object of the invention is to provide a magnetic amplifier which is based on a principle different from that of the Ramey amplifier and which permits, in contrast with the Logan amplifier, a high amplification of power as well as a short time of response. It affords the important advantage that material having a rectangular hysteresis loop is not required for satisfactory operation and, on the contrary, material of low remanence is preferable.

The present invention relates to a magnetic amplifier comprising a transductor having a core of saturable magnetic material carrying at least one winding which is connected, in series with a first rectifier and a load, to a source of alternating supply voltage. The invention features a capacitor coupled to said winding so as to constitute, together with the effective inductance of said winding, an oscillatory circuit having a natural frequency of the order of the supply frequency, and that a control circuit is coupled to the circuit bringing about an adjustable damping of said oscillatory circuit.

It is to be noted that it is known per se to connect a capacitor parallel to a transductor coil, for example, to make a higher harmonic of the supply frequency effective. However, such known amplifying devices do not show the combination of steps as described above. It is only this combination which makes it possible to obtain the particular effects as will be described hereinafter.

An amplifier according to the invention has, in addition to the advantage of an extremely short time of response, a very low reaction. Also the use of expensive magnetic material having a rectangular hysteresis loop is not required. Hence, even high powers may be controlled by this amplifier with a short time of response and in an economic way. The time of response need be not more than the duration of one cycle of the supply oscillation.

Figures 9, 10:
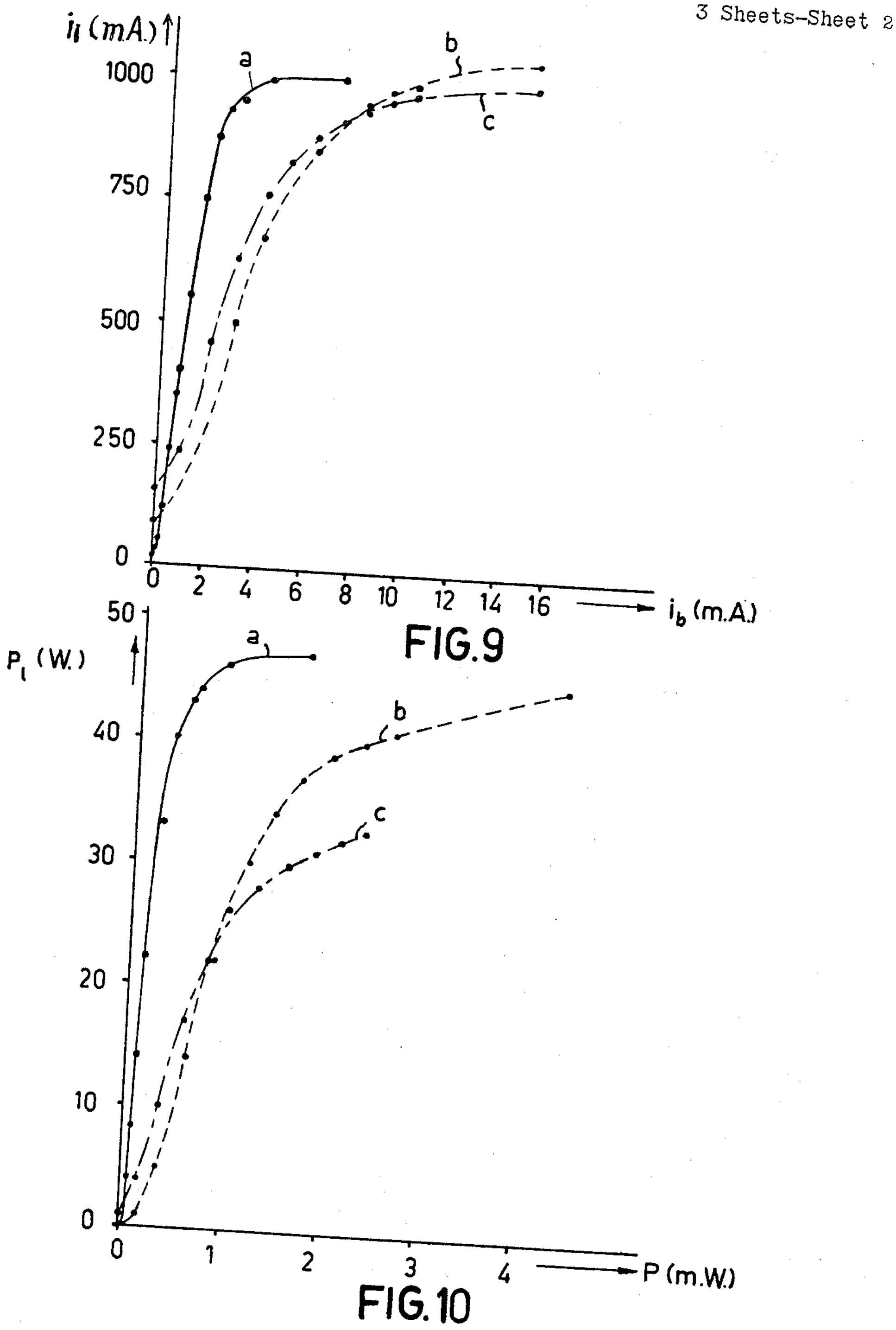
Figure 11:
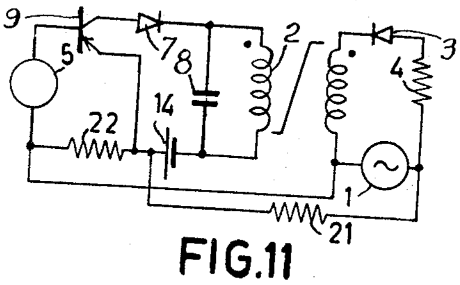

In order that the invention may be readily carried into effect, it will now be described in detail, by way of example, with reference to the accompanying drawing in which:

FIGS. 1 and 4 illustrate first and second prior art magnetic amplifier circuits, FIGS. 2 and 3 show waveforms that are helpful to an understanding of the invention, FIG. 5 is a circuit diagram illustrating one preferred embodiment of the invention, FIGURES 9 and 10 show amplification curves obtained with an amplifier as shown in FIGURE 5, and FIGURES 6 to 8 and FIGURES 11 to 15 show further embodiments and variants respectively of the invention.

Referring now to FIGURE 5, the source of alternative supply voltage is again indicated by 1, the transductor by 2, the rectifier in the supply circuit by 3 and the load by 4. For optimum action the alternating supply voltage has approximately a value $\omega N\phi_s$, where $\omega$ is the angular frequency of the alternating supply voltage, N is the number of turns and $\phi_s$ is the saturation flux of the material of the core of the transductor 2.

In contrast with the Ramey amplifier, firstly the rectifier 7 is connected in opposition to the rectifier 3 (and thus passes a current corresponding to the same direction of magnetization in the transductor core as the rectifier 3), secondly a supply oscillation need not be supplied to the control circuit, thirdly the material used for the core of the transductor 2 has a hysteresis curve as shown diagrammatically in FIGURE 3*a*, and fourthly the transductor 2 is shunted by a capacitor 8 which constitutes, together with the effective inductance of the transductor, a resonant circuit which is tuned to the supply frequency.

The core of the inventive idea lies in the manner in which the initial flux at the beginning $t_3$ of the period of conduction of the rectifier 3 is established in the supply circuit. In the Logan circuit the control source itself must supply the power therefor. In the Ramey circuit the alternating supply voltage provides said initial flux as a function of, for example, a control voltage or a variable resistor in the control circuit; without it the flux would run exactly from the positive saturation to the negative saturation. The control element counteracts the variation in flux to an extent dependent on its magnitude.

The amplifier according to the invention is based on the idea that magnetic energy is still present in the core of the transductor at the end of the load current pulse (instants $t_6$ and $t_1$ in FIGURE 2) and that this magnetic energy may fundamentally be converted into electric energy and subsequently again into magnetic energy. The direction of the current at the end of a half cycle of the resonant circuit formed by the transductor 2 and the capacitor 8 (instant $t_3$) is exactly opposite, however, to that at the beginning of said half cycle.

For satisfactory operation as an oscillatory circuit it is necessary:

(a) To uncouple the load 4, which is effected automatically by the available rectifier (3);

(b) To connect a capacitor (8) of suitable value parallel to the transductor 2; during the period $t_1$ to $t_3$ the capacitor must constitute, together with the transductor 2, an oscillatory circuit across which a voltage $v$ appears which is smaller than the supply voltage $u$ so that the rectifier 3 remains cut off;

(c) To use magnetic material which, in the unsaturated state of the transductor coil, constitutes a good approximation of an ideal inductance (FIGURE 3*c*).

During the half cycle $t_3$ to $t_6$ of the supply oscillation in which the rectifier 3 is conducting, the transductor 2 absorbs an amount of energy proportional to $\int H dB$, where H is the magnetic field strength and B is the magnetic induction in the core of the transductor. Said magnetic energy may be transferred to the capacitor 8 during the time in which the supply voltage $u$ decreases and the material of the core becomes unsaturated again. Said energy, taking into account further losses, is not more than the amount corresponding to the cross-hatched area in FIGURE 3*c*. At the instant $t_1$ or $t_6$ when the rectifier 3 is cut off, said energy in the capacitor 8 must be adequate for controlling the core of the transductor in the third quadrant of its hysteresis curve (FIGURE 3*c*). Preferably said area must therefore be as large as possible or, in other words, the remanence $B_r$ must be as low as possible, for example, lower than 0.7 $B_s$. Said area may also be artificially increased by making an additional field active in the core which is opposite to that corresponding to the current flowing through the rectifier 3, for example, by supplying, in addition to the alternating supply current (source 1), a direct current opposite to the current corresponding to the pass direction of rectifier 3 (source 10 in FIGURE 6), for example, to a separate winding 11.

For control, it is sufficient to provide a variable damping means which determines the value of the negative current and hence of the flux in the transductor 2 at the instant $t_3$. A rectifier 7 is provided to ensure that said damping means becomes active only during the period $t_1$ to $t_3$. Said damping means may exist in a variety of forms, for example, as a variable resistor, a light-sensitive or temperature-sensitive resistor, a variable control voltage (source 12) in series-opposition to the rectifier 7 (FIGURE 7), a triode, a pentode (in general a high-vacuum tube or gas-filled tube), a transistor (if desired with a bias between its collector and emitter or between its collector and base), a photo-electric cell, and so on.

FIGURE 5 shows, as a preferred solution, a transistor 9 as a damping element in series with the rectifier 7. To reduce the dissipation in the transistor 9, the current source 5 need not necessarily supply a constant current, but instead a pulsatory control current may be provided by current source 5' in FIG. 6 which periodically drives the transistor 9 momentarily into saturation. A suitably chosen resistor for the collector (13 in FIG. 6) then provides for absorbing the energy of the resonant circuit 2–8. The repetition-time of said pulses has to be smaller than the time interval $t_1$ to $t_3$ and the effective damping of circuit 2–8 greatly depends on the ratio of these two time intervals.

In the embodiment according to FIGURE 7, control is effected by means of a variable voltage source 12, which is connected in series-opposition to rectifier 7. Hence, damping of circuit 2–8 occurs as soon as voltage V (FIGURE 2) exceeds, i.e., becomes more negative than, the instantaneous voltage of source 12.

If, as in FIGURE 8, a tube 20 is used as the damping element, it is possible to utilize at the same time its rectifying action, namely its ability to block the flow of a positive current from the cathode to the anode, so that a separate rectifier 7 becomes redundant. Hence, tube 20 provides a variable damping during the time interval $t_1$ to $t_3$ only.

The damping may appear across the main winding of the transductor, but alternatively across a portion thereof, or across a second coil on the same core. The same applies to the capacitor 8.

Although the magnetic material should approximate the idealized curve of FIGURE 3*a*, tests have revealed that ordinary materials used for the core yield satisfactory results, as can be seen from the characteristics in FIGURES 9 and 10, which illustrate respectively the mean current $i_L$ flowing through the load 4 as a function of the base current $i_b$ of transistor 9 in FIGURE 5 and the power $P_L$ dissipated through the load 4 as a function of the base control power $P_b$ of transistor 9. Curves *a*, *b* and *c* are for the materials which are commercially sold as "Mu-Metal" (curve *a*), as "Trafoperm $N_2$" (curve *b*) and as transformer sheet metal (curve *c*). The control source 5 is included between the base and the emitter of transistor 9. Said materials are considerably cheaper than "rectangular" material. A power amplification of 60 db—the maximum amplification which, according to the literature, is obtainable with the Ramey amplifier—can be realized in every respect. As compared with the Logan amplifier, the power amplification, with circuit elements otherwise equally proportioned, is more than $4\alpha_{cb}^2$ times as high, where $\alpha_{cb}$ is the collector-base current gain factor of transistor 9. The following circuit elements were employed:

Transductor 2 having an effective inductance of 58 H, material of the core is Mu-Metal.

Capacitor 8 of 0.2 $\mu$F.

Transistor 9 is ASZ 15, rectifiers 3 and 7 are OA 31 and OA 214, respectively, the supply voltage is 50 volts eff. at a frequency of 50 c./s.

The natural frequency of the resulting oscillatory circuit is not very critical, although optimum results were obtained at a natural frequency equal to the supply frequency or, in other words, at that value of capacitor 8 for which the current in the load circuit is a minimum in the absence of control damping. A choice of said natural frequency between 0.5 and 1.3 times the supply frequency was found in practice to be permissible in every respect. The results progressively decreased with greater deviations. The essential point only is that, on the one hand, the natural frequency of the circuit 2–8 must not be so high that the voltage *v* in FIGURE 2 becomes more negative than the voltage *u*, due to which the rectifier 3 would become conducting, and on the other hand, not so low that an unwanted degree of magnetization remains in the core at the instant $t_3$. The use of still larger capacitors is permissible when using an auxiliary direct current as shown in FIGURE 6.

The losses which invariably exist make it impossible to reach negative value of saturation. It is possible to supplement these losses, but this is generally not advisable since the simplicity of the circuit would be partly lost as a consequence. On the other hand it is possible, for example, by using an additional direct-current source 14 for the collector supply and making a portion of the alternating supply voltage from the source 1 active in the base circuit of the control transistor 9 (FIGURE 11), to achieve that the voltage *v* in FIGURE 2 is artificially increased to almost the voltage *u* so that the negative value of saturation is more closely approximated. To this end source 1 is connected through resistor 21 to resistor 22, which in inserted in the base branch of transistor 9. If the sum of the voltages across resistor 22 produced by source 1 and source 5 polarize the emitter-base junction of the transistor 9 in the forward direction, transistor 9 becomes conductive and effects damping of circuit 2–8.

Figure 12:
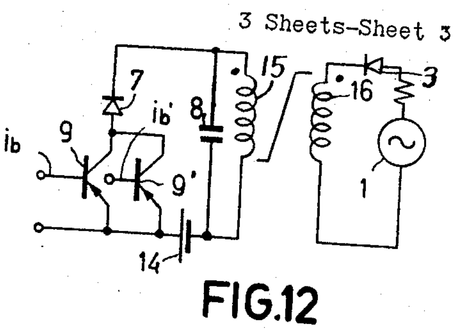

The basic circuit shown in FIGURE 5 may furthermore be used in multiplex or modified in various ways. FIGURE 12 shows an example which utilizes a parallel combination of transistors 9 and 9', which is connected, for example, to a common rectifier 7, for control as a function of various input signals ($i_b$, $i_b'$). The advantage is thus obtained that substantially no coupling exists between the different base-emitter control inputs. In contrast therewith the control voltage in the Ramey circuit must be connected in series for the same purpose, resulting in a considerable mutual coupling. As before, the transistor 9 or the transistors 9 and 9' may, if desired, be provided with a common direct-voltage source 14 for the collector supply.

Figure 13:
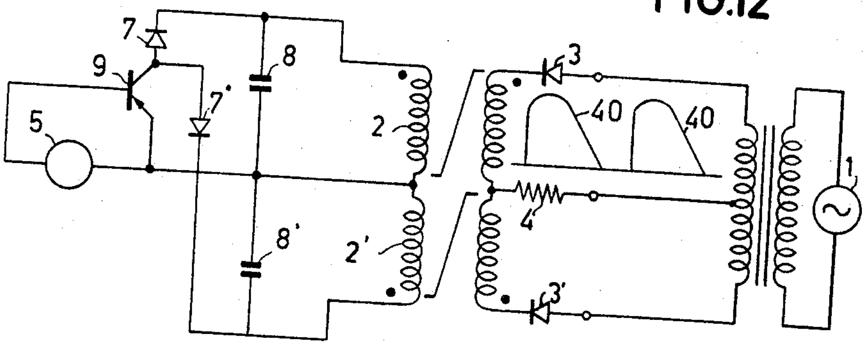
Figures 14, 15:
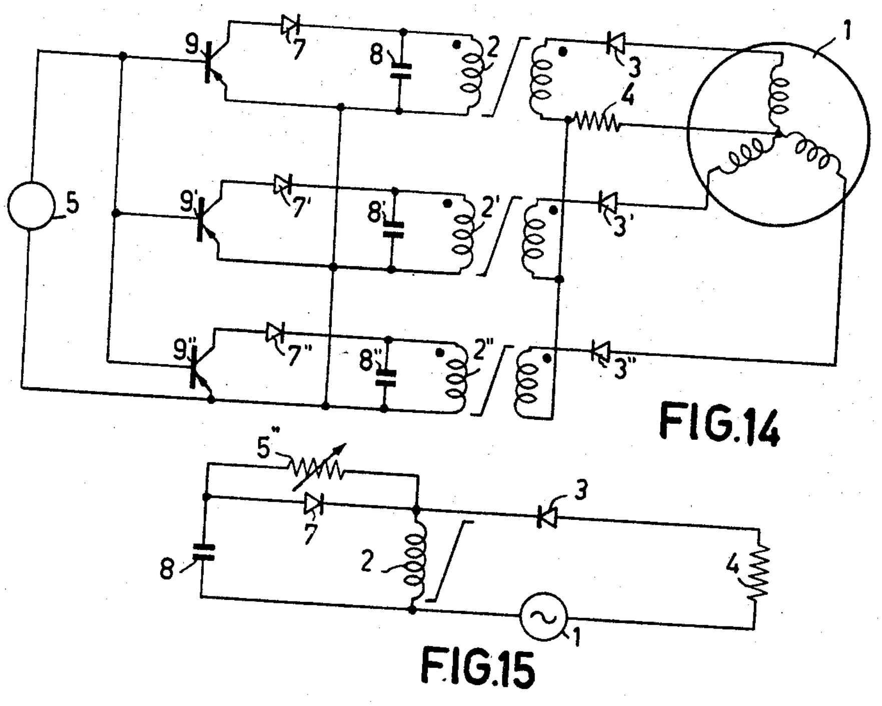

FIGURE 13 shows an example in which the output circuits of two circuits of FIGURE 5 are connected in parallel to a load 4 so as to obtain a direct current having less ripple. Hence, during the positive half period of the supply voltage. rectifiers 3 and 7' are conductive, during its negative half period rectifiers 3' and 7 become conductive. In the example shown, current pulses 40 flow through the load 4 twice during each cycle of the supply current of the source 1. Also the source 1 can supply a multiphase alternating supply current, as shown in FIGURE 14, each phase feeding a circuit as shown in FIGURE 5, which circuits, as before, are connected parallel to the load 4. The damping may fundamentally be brought about by, for example, one transistor (9) through diodes 7 and 7' (see FIGURE 13), connected to the oscillatory circuits 8–2 and 8'–2'–, respectively, provided the damping current pulses do not overlap. However, in view of the dissipation, the use of separate transistors 9, 9', 9'' (FIGURE 14) is preferable.

Besides, an adjustable alternating current power can be obtained in the load 4 by the use of, for example, two circuits of FIGURE 5.

It is fundamentally also possible to make an adjustable series-element active in the resonance circuit controlled by the transductor 2 and the capacitor 8 (FIGURE 15). During a portion of the period $t_1$ to $t_3$ in which the rectifier 3 is cut off, the induced EMF of the transductor 2 will open the rectifier 7. Then the polarity of the current flowing through the transductor 2 is inverted and a decay voltage *v* will be obtained (FIGURE 2) the value of which depends upon the variable damping resistor 5''. However, this method of switching is considerably more critical than in the amplifiers described hereinbefore, so that it is more difficult to arrive at the high power control desired. If, however, the rectifier 7 is omitted in this circuit, the reaction of the supply circuit on the control element 5'' will increase considerably.

What is claimed is:

1. A magnetic amplifier comprising a transductor having a core of saturable magnetic material having at least one winding wound thereon, a first rectifier, a load, a source of alternating voltage supply, means for connecting said one winding, said first rectifier and said load in series to said voltage source, a capacitor coupled to said one winding so as to constitute, together with the effective inductance of said winding, a resonant circuit having a natural frequency approximately of the same order as the supply frequency, and a control circuit including adjustable damping means coupled to the resonant circuit to provide a current path for controlling the magnetization current in said winding during the nonconductive half cycle of said rectifier.

2. An amplifier as claimed in claim 1, in which the control circuit is coupled to said resonant circuit by means of a second rectifier, characterized in that said first and second rectifiers are connected so that they each pass current to said winding in a direction corresponding to the same direction of magnetization of the core of the transductor.

3. An amplifier as claimed in claim 2 wherein said adjustable damping means comprises controllable impedance means connected in series between the transductor winding and the capacitor.

4. An amplifier as claimed in claim 2 wherein said adjustable damping means comprises a source of variable direct voltage connected in series-opposition with the second rectifier.

5. An amplifier as claimed in claim 2 wherein said transductor has a core composed of a material such that at the moment said first rectifier is cut off, an amount of energy is accumulated in the capacitor which is sufficient to drive the core of the transductor during the nonconductive period of the first rectifier.

6. A magnetic amplifier comprising a saturable magnetic core, winding means wound on said core, a source of alternating current voltage of a given frequency, a capacitor coupled to said winding means to form a resonant circuit therewith having a resonant frequency approximately of the same order as said given frequency, first rectifier means, a load impedance, means connecting a portion of said winding means, said first rectifier means, said load impedance, and said voltage source in series to form a load circuit in which said first rectifier means conducts load current during alternate half cycles of said alternating voltage, a control circuit including variable damping means for controlling the magnetization level of said core as a function of a control quantity, and means for coupling said control circuit to said winding means to provide a path for the flow of magnetization current in said winding means, said coupling means including means for effectively decoupling said control circuit from said winding means during a portion of the conductive interval of said first rectifier means.

7. An amplifier as claimed in claim 6 wherein said control circuit and coupling means comprises a unidirectionally conductive element connected in parallel with said resonant circuit and having a control electrode for receiving said control quantity, said element being poled so as to pass current to said winding means to magnetize said core in the same direction as the current passed by said first rectifier means to said winding means.

8. A magnetic amplifier comprising a saturable magnetic core, winding means wound on said core, a source of alternating current voltage of a given frequency, a capacitor effectively connected across said winding means so as to form, together with the effective inductance of said winding means, a parallel resonant circuit having a resonant frequency approximately of the same order as said given frequency, first rectifier means, a load impedance, means connecting said first rectifier means, said load impedance, and said voltage source in series circuit across said winding means, second rectifier means, variable damping means, and means connecting said second rectifier means and said variable damping means in a second series circuit across said winding means, said first and second rectifier means being poled so that they each pass current to said winding means to produce the same direction of magnetization of the core.

9. An amplifier as claimed in claim 8 wherein said damping means comprises a transistor having its emitter-collector path connected in series with said second rectifier means and its base electrode connected to a source of control current.

10. An amplifier as claimed in claim 9 wherein said control current source is arranged to supply discrete pulses of current to said base electrode.

11. An amplifier as claimed in claim 8 wherein said damping means comprises first and second transistors having their respective emitter-collector paths connected in parallel with each other and in series with said second rectifier means, and first and second sources of control current individually connected to the base electrodes of said first and second transistors.

12. An amplifier as claimed in claim 8 wherein said damping means comprises a source of variable direct voltage connected in series opposition to said second rectifier means.

13. An amplifier as claimed in claim 8 further comprising means for producing a magnetic field in said core that is opposed to the magnetic field produced therein by the current passed by said first rectifier means.

14. An amplifier as claimed in claim 8 further comprising means for adjusting the flux level in said core, said adjusting means including means directly coupling said alternating voltage source to said second series circuit so as to control said damping means to vary the magnitude of the current passed by said second rectifier means to said winding means.

15. A magnetic amplifier comprising saturable reactor core means, first and second winding means wound on said core means, a source of alternating voltage of a given frequency, first and second capacitors coupled to said first and second winding means, respectively, so as to form, together with the effective inductances of said first and second winding means, respectively, first and second parallel resonant circuits tuned approximately to the frequency of said voltage source, a load, first and second rectifiers, means connecting said voltage source and said load in a first series circuit with said first rectifier and a portion of said first winding means and in a second series circuit with said second rectifier and a portion of said second winding means so that said rectifiers conduct load current during alternate half cycles of said alternating voltage, variable damping means responsive to a control quantity, third and fourth rectifiers, first means connecting said damping means and said third rectifier in series to said first winding means, second means connecting said damping means and said fourth rectifier in series to said second winding means, said third and fourth rectifiers being poled to conduct during the nonconductive half cycles of said first and second rectifiers, respectively.

16. An amplifier as claimed in claim 15 wherein said core means comprises first and second saturable magnetic cores and said first and second winding means each comprise a load winding and a control winding wound on the respective first and second cores, each of said load windings being connected in series with its respective rectifier to said load and said voltage source and each of said control windings being connected in series with its respective rectifier to said damping means, said first and second capacitors being individually coupled to the control windings of said first and second winding means, respectively, said damping means comprising a single damping element having a control terminal for varying the impedance thereof, and a source of control current coupled to said control terminal.

17. A magnetic amplifier comprising a polyphase source of alternating current voltage of a given frequency, saturable magnetic reactor core means, a plurality of winding means equal to the number of phases of said polyphase voltage source and wound on said core means, a plurality of capacitors equal to the number of winding means, means connecting said capacitors to individual portions of said plurality of winding means to form a corresponding plurality of parallel resonant circuits tuned approximately to the frequency of said polyphase voltage source, a load, a first plurality of rectifiers corresponding in number to the number of winding means, means connecting said load in a plurality of individual series circuits with said plurality of rectifiers and individual portons of said plurality of winding means, a plurality of variable damping elements and a second plurality of rectifiers corresponding to the number of winding means, and means connecting said damping elements and said second plurality of rectifiers in individual series circuits with individual portions of said plurality of winding means.

18. An amplifier as claimed in claim 17 wherein each of said damping elements has a control terminal for varying the impedance thereof, and a single source of control current connected to each of said control terminals for simultaneously controlling said damping elements.

References Cited

UNITED STATES PATENTS

| | | | |
|---|---|---|---|
| 3,029,394 | 4/1962 | Finnamore | 330—3 |
| 3,138,753 | 6/1964 | Covert | 330—8 X |

ROY LAKE, *Primary Examiner.*

N. KAUFMAN, *Assistant Examiner.*

PATENT OFFICE

Washington, D.C. 20231

UNITED STATES PATENT OFFICE

CERTIFICATE OF CORRECTION

Patent No. 3,408,583 October 29, 1968

Marinus Pieter Breedveld et al.

It is certified that error appears in the above identified patent and that said Letters Patent are hereby corrected as shown below:

Column 2, line 21, after "source" insert -- 5 --. Column 3, line 71, "alternative" should read -- alternating --. Column 6, line 67, "series-element" should read -- series-damping element --.

Signed and sealed this 7th day of April 1970.

(SEAL)
Attest:

Edward M. Fletcher, Jr.
Attesting Officer

WILLIAM E. SCHUYLER, JR.
Commissioner of Patents